(12) United States Patent
Chen

(10) Patent No.: US 11,132,460 B2
(45) Date of Patent: Sep. 28, 2021

(54) APPARATUS AND METHOD FOR CONTROLLING ACCESS TO USER INFORMATION

(71) Applicant: MOAC BLOCKCHAIN TECH INC, Palo Alto, CA (US)

(72) Inventor: Xiaohu Chen, Mountain View, CA (US)

(73) Assignee: MO AC BLOCKCHAIN TECH INC., Palo Alto, CA (US)

( * ) Notice: Subject to any disclaimer, the term of this patent is extended or adjusted under 35 U.S.C. 154(b) by 251 days.

(21) Appl. No.: 16/434,642

(22) Filed: Jun. 7, 2019

(65) Prior Publication Data
US 2020/0387621 A1 Dec. 10, 2020

(51) Int. Cl.
| | |
|---|---|
| *H04L 29/06* | (2006.01) |
| *G06F 21/62* | (2013.01) |
| *G06F 21/44* | (2013.01) |
| *G06F 16/182* | (2019.01) |
| *H04L 9/30* | (2006.01) |
| *H04L 9/06* | (2006.01) |

(52) U.S. Cl.
CPC ...... *G06F 21/6227* (2013.01); *G06F 16/1824* (2019.01); *G06F 21/44* (2013.01); *G06F 21/629* (2013.01); *H04L 9/0643* (2013.01); *H04L 9/30* (2013.01); *H04L 2209/38* (2013.01)

(58) Field of Classification Search
CPC .. G06F 21/62; G06F 21/6209; G06F 21/6218; G06F 21/6227; G06F 16/1824; G06F 21/44; G06F 21/629; H04L 9/0643; H04L 9/30; H04L 2209/38; H04L 9/0637; H04L 9/0618; G06Q 20/06; G06Q 20/382; G06Q 20/401; G06Q 2220/00; G06Q 20/381; G06Q 40/04
See application file for complete search history.

(56) References Cited

U.S. PATENT DOCUMENTS 5,566,319 A * 10/1996 Lenz ................... G06F 9/52
 711/147
5,857,020 A * 1/1999 Peterson, Jr. .......... G06Q 20/12
 705/52

(Continued)

OTHER PUBLICATIONS

Cheng, Yuan; Park, Jaehong; Sandhu, Ravi; Preserving User Privacy from Third-Party Applications in Online Social Networks, May 2013, WWW '13 Companion: Proceedings of the 22nd International Conference on World Wide Web, https://doi.org/10.1145/2487788.2488032, pp. 723-728 (Year: 2013).*

*Primary Examiner* — Malcolm Cribbs

(57) ABSTRACT

An apparatus and method control access to user information by generating a record of user information that includes the user information and appending the record of user information to a blockchain. A hash is assigned to the user information and the record of user information is encrypted prior to appending the record of user information to the blockchain. A record of authorization is received and appended to the blockchain. The record of authorization includes the user information, an identification of a third-party application authorized to read the record of authorization, and an access expiration parameter that places a restriction or limitation on access to the user information.

18 Claims, 6 Drawing Sheets

(56) References Cited

U.S. PATENT DOCUMENTS

| | | | | |
|---|---|---|---|---|
| 8,161,075 | B1* | 4/2012 | Long | G09B 7/02 |
| | | | | 707/793 |
| 10,454,906 | B1* | 10/2019 | Sharfman | G06F 21/602 |
| 10,824,759 | B1* | 11/2020 | Magerkurth | H04L 9/3247 |
| 10,964,145 | B2* | 3/2021 | Galvez | H04L 9/321 |
| 2006/0138236 | A1* | 6/2006 | Hepworth | G06K 7/14 |
| | | | | 235/454 |
| 2010/0011431 | A1* | 1/2010 | Cynkin | H04L 63/0807 |
| | | | | 726/9 |
| 2018/0027018 | A1* | 1/2018 | McErlane | H04L 9/0872 |
| | | | | 713/152 |
| 2018/0144153 | A1* | 5/2018 | Pead | G06F 21/6245 |
| 2019/0007722 | A1* | 1/2019 | Stromberg | G06F 21/10 |
| 2019/0158594 | A1* | 5/2019 | Shadmon | H04L 9/0819 |
| 2019/0197532 | A1* | 6/2019 | Jayachandran | G06Q 20/3829 |
| 2019/0205563 | A1* | 7/2019 | Gonzales, Jr. | H04L 9/30 |
| 2019/0305949 | A1* | 10/2019 | Hamel | H04L 9/3226 |
| 2019/0384932 | A1* | 12/2019 | Pratt | G06F 21/6245 |
| 2020/0026834 | A1* | 1/2020 | Vimadalal | G06F 16/182 |

* cited by examiner

APPARATUS AND METHOD FOR CONTROLLING ACCESS TO USER INFORMATION

TECHNICAL FIELD

The present disclosure relates generally to the collection, storage, and distribution of user information over computer networks, and more particularly, to apparatuses and methods that control third-party access to user information.

BACKGROUND

The average smartphone user these days has between 60 and 90 applications on their device. Most of these applications request some sort of information about the user and the device being using. For example, these applications may want to know the user's name, email address, or real-world address. Depending on the application, additional and more highly sensitive personal or financial information may be required, such as date of birth, social security number, annual income, credit score, etc.

In a conventional application architecture, user information is stored on a centralized application server for each application being used. For example, with reference to FIG. 1, for each of applications 1 through n that a user downloads and creates an account, the user is required to enter some personal user information. This user information is stored in a persistent storage, e.g., server database, associated with the application server for that application, and ownership of this user information is no longer under the control of user. Instead, the application provider has control of the information and also have the right to sell the information for profit. While the foregoing use of user information is typically done with the user's consent, some applications share sensitive data with third parties without notifying users, and this rings alarm bells among users who are careful about their privacy.

In addition to concerns over privacy and the control of user information, conventional application architectures are also inconvenient in that the user is required to repeatedly enter much of the same user information for each application. A user, however, may enter slightly different information for one application relative to another application. This may lead to inconsistent user information being stored on various application platforms.

It is therefore desirable to provide a user the ability to centralize the storage of her user information and the ability to control access to user information. The concepts disclosed below address this need and others.

SUMMARY

An apparatus and method control access to user information by generating a record of user information that includes the user information and appending the record of user information to a blockchain. A hash is assigned to the user information and the record of user information is encrypted prior to appending the record of user information to the blockchain. A record of authorization is received and appended to the blockchain. The record of authorization includes the user information, an identification of a third-party application authorized to read the record of authorization, and an access expiration parameter that places a restriction or limitation on access to the user information.

An authorized third-party application may read a record of authorization and either proceed to read the user information from the record or refrain from reading the user information depending on the restriction or limitation placed on access by the access expiration parameter. For example, the access expiration parameter may limit access to the record of authorization by the third-party application to a duration of time. If the third-party application reads the record of authorization prior to the expiration of the time, the application may read the user information. If, however, the third-party application reads the record of authorization after the expiration of the time, the application refrains from reading the user information.

It is understood that other aspects of methods, apparatuses and mechanisms, will become readily apparent to those skilled in the art from the following detailed description, wherein various aspects are shown and described by way of illustration.

BRIEF DESCRIPTION OF THE DRAWINGS

Various aspects of methods, apparatuses and mechanisms will now be presented in the detailed description by way of example, and not by way of limitation, with reference to the accompanying drawings, wherein.

DETAILED DESCRIPTION

Disclosed in detail below is an apparatus for controlling access to user information. The apparatus, which may be a node in a decentralized network of nodes that execute blockchain functions, is configured to implement various functions of an information control mechanism that provides for the storage of user information in a single location, e.g., a public blockchain, and subsequent access to the user information at the single location across multiple third-party applications. Because storing the user information in a public blockchain could be a challenge since all information is public, the information control mechanism disclosed herein allows for user-controlled, application-specific access to information. To these ends, the mechanism involves encryption and time-based restrictions on the access to user information.

The information control mechanism involves an enrollment function, an authorization function, and an access function. The enrollment function is configured to generate a record of user information that includes the user information, and to append the record of user information to a blockchain in a block of data. The authorization function is configured to receive a record of authorization, and to append the record of authorization to the blockchain. The record of authorization includes the user information, an identification of a third-party application authorized to read the record of authorization, and an access expiration parameter that places one or more limitations, such as a time-based restriction, on access to the user information. The access function is configured to control the storage of user information by third-party applications based on the access expiration parameter to prevent access to records of authorization that have expired.

Figure 2:
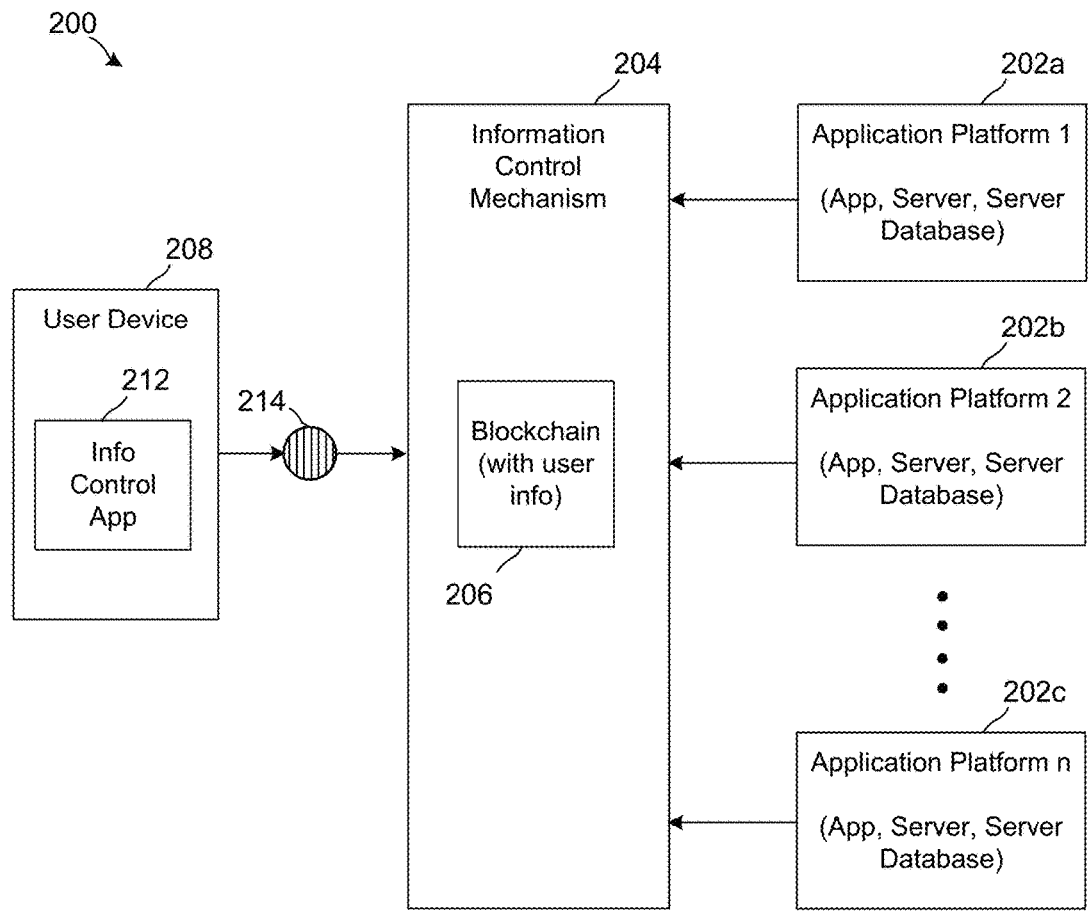
FIG. 2 is an illustration of a centralized model of collecting, storing, and authorizing access to user information across a number of application platforms, that employs an information control mechanism with blockchain functionality.
Figure 2:
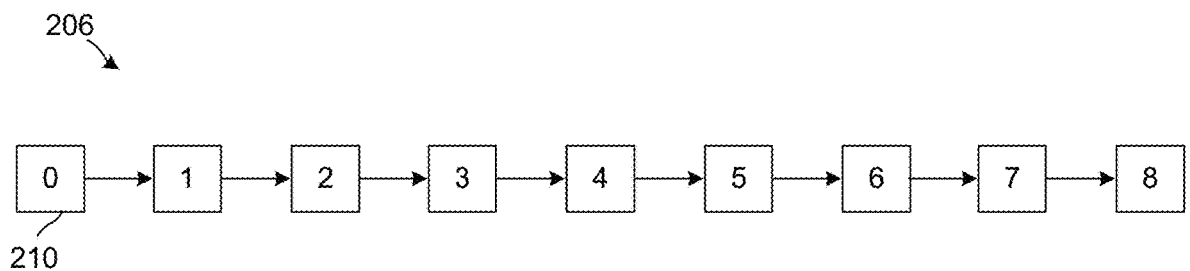

With reference to FIG. 2, a centralized model 200 of collecting, storing, and authorizing access to user information across a number of third-party application platforms 202a, 202b, 202c includes an information control mechanism 204. The information control mechanism 204 may be implemented using one or more nodes of a decentralized network of nodes that are configured to execute blockchain transactions. For example, referring to FIG. 3, a peer-to-peer network 300 having a large number of distributed nodes 302 may form a decentralized network or system. The number of nodes 302 in the decentralized network 300 may be, for example, around 10,000.

Figure 3:
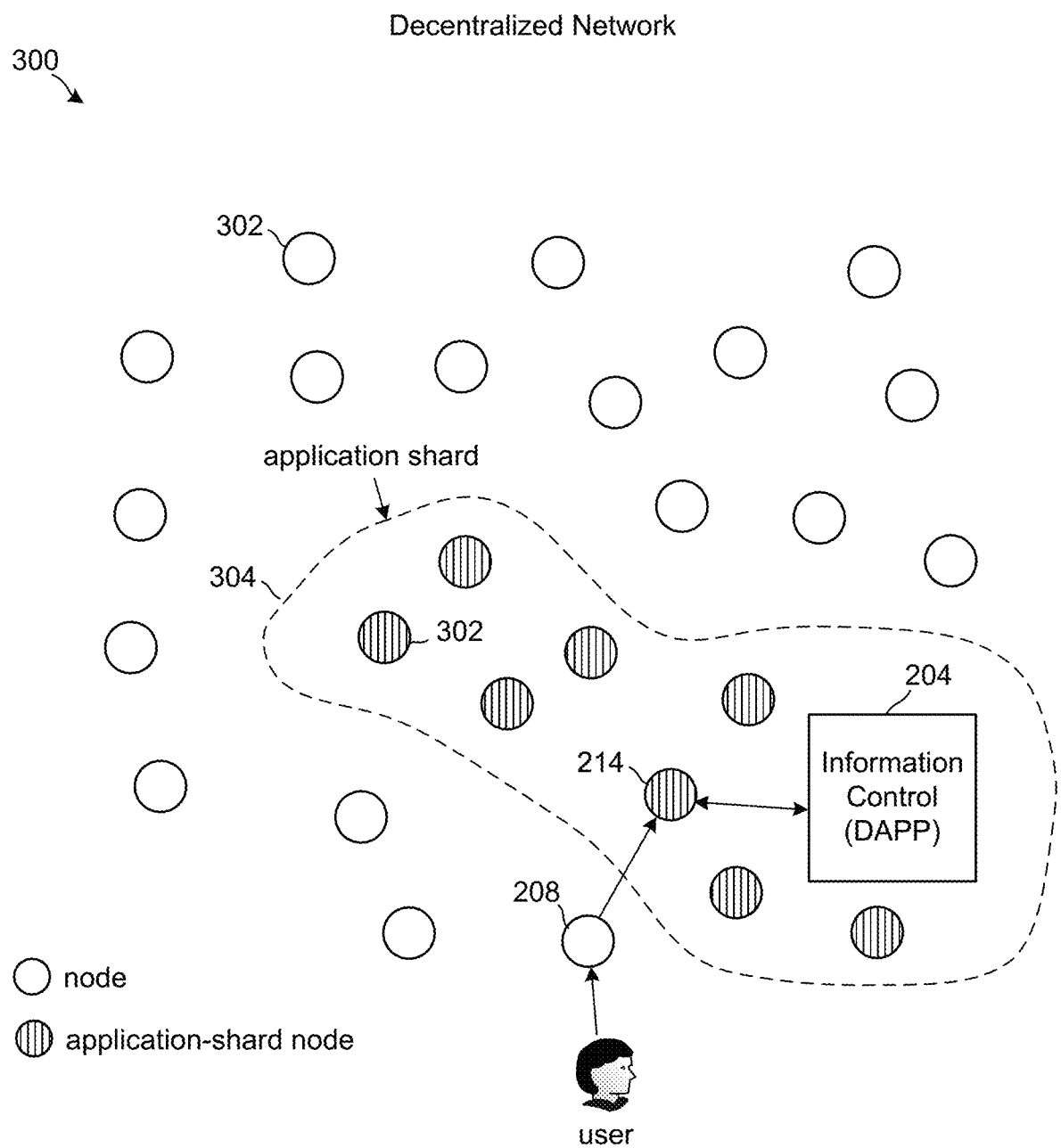
FIG. 3 is an illustration of a decentralized network, including a group of nodes forming an application shard for implementing the information control mechanism of FIG. 2.

Nodes 302 within the decentralized network 300 may be grouped into an application shard 304. While a large number of nodes 302 and shards 304 may be present in a large-scale decentralized network, for ease of illustration, a reduced number of nodes and shards are shown in FIG. 3. The application shard 304 represents a logical grouping of nodes 302 within the decentralized network 300, that function together to execute or run the information control mechanism 204. In one configuration, the information control mechanism 204 is embodied as a decentralized application (DAPP) that is run by the nodes 302 associated with the application shard 304. The nodes 302 in the application shard 304 may be coordinated to perform certain tasks of the information control mechanism 204, including for example, receiving and processing user information, storing user information in a blockchain, and authorizing access to user information from the by third-party application platforms.

Returning to FIG. 2, the information control mechanism 204 is configured to store user information in a blockchain 206. As shown at the bottom of FIG. 2, the blockchain 206 includes a sequence of instances 210 of a blockchain, each instance being indicated by a number. Each instance 210 includes a copy of records included in the previous instance, in addition to a new record of information that is appended to the blockchain. Thus, for example, instance #2 of the blockchain includes a copy of the records includes in instance #1 of the blockchain, which in turn includes a copy of the records includes in instance #0 of the blockchain. As such, each instance 210 of the blockchain 206 represents an accumulation of all prior records recorded in the blockchain.

In accordance with embodiments disclosed herein, user information is appended to the blockchain 206. To this end, a user device 208 operating in accordance with an information control application 212 resident on the user device may access a node 214 that is configured to perform certain tasks of the information control mechanism 204 related to the collection of user information.

The information control application 212 enables the user device 208 to receive inputs corresponding to user information. For example, the information control application 212 may cause the user device 208 to display a graphical user interface through which a user may enter user information. The information control application 212 also enables the user device 208 to submit the user information to the node 214 for appending to the blockchain 206. For example, the information control application 212 may cause the user device 208 to display a "submit information" button, which when activated causes the user device 208 to communicate the user information to the node 214 for appending to the blockchain 206. The user information appended to the blockchain at this stage is referred to herein as a "record of user information" or an "original record of user information."

Figure 1:
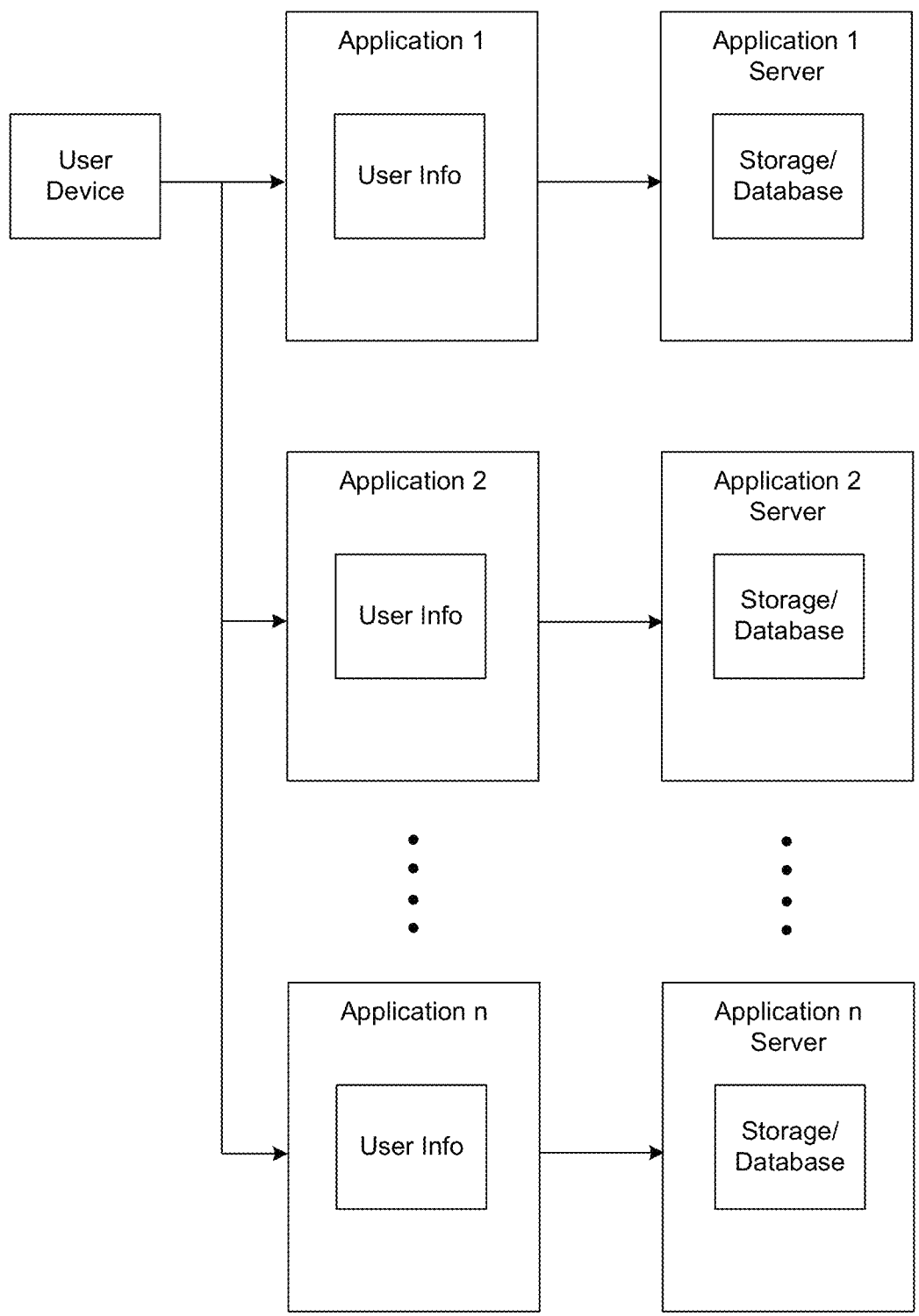
FIG. 1 is an illustration of a conventional model of collecting, storing, and distributing user information across a number of application platforms.

Subsequently, the user device 208 may download one or more third-party applications corresponding to the third-party application platforms 202a, 202b, 202c that require user information. In accordance with embodiments disclosed herein, instead of invoking the conventional model (shown in FIG. 1) of entering the user information directly through the application for storage in the third-party storage database, the user authorizes each of the one or more third-party applications platforms 202a, 202b, 202c access to the user information recorded in the blockchain 206. To this end, the user device 208 operating in accordance with the information control application 212 resident on the user device may access a node 214 that is configured to perform certain tasks of the information control mechanism 204 related to authorizing access to user information.

The information control application 212 enables the user device 208 to interact with the node 214 to generate an additional record related to authorization. This additional record, referred to herein as a "record of authorization," is generated for the one or more third-party application platforms 202a, 202b, 202c and appended to the blockchain 206. As part of generating a record of authorization, the information control application 212 enables the user device 208 to receive inputs corresponding to authorization information. For example, the information control application 212 may cause the user device 208 to display a graphical user interface through which a user may enter authorization information, including for example, an identification, e.g., hash, of user information for which access is to be authorized, an identification of the third-party application platform 202a, 202b, 202c to which access is to be granted, and an expiration parameter that defines a duration of time for which such access is to be granted.

As part of generating a record of authorization, the information control application 212 also enables the user device 208 to communicate with the node 214 to access the record of user information in the blockchain 206 corresponding to the identified user information. For example, the information control application 212 may cause the user device 208 to display a "create record" button, which when activated causes the user device 208 to communicate the identification of the user information to the node 214 along with a request that the information be communicated to the user device 208.

Upon receipt of the user information at the user device 208, and as part of generating a record of authorization, the information control application 212 also enables the user device to generate a record of authorization that includes the user information and other authorization information. The information control application 212 also enables the user device to submit the record of authorization to the node 214 for appending to the blockchain 206. For example, the information control application 212 may cause the user device 208 to display a "submit authorization" button, which when activated causes the user device 208 to communicate the record of authorization to the node 214 for appending to the blockchain 206.

In accordance with embodiments disclosed herein, the one or more third-party application platforms 202a, 202b, 202c access the blockchain and extract user information from the record of authorization in accordance with one or more rules. For example, while the application platforms 202a, 202b, 202c are permitted to store the user information in non-persistent memory as needed while executing operations on behalf of the user, the platforms are not permitted to transfer and store user information in persistent memory, e.g., server database. Accordingly, each time the third-party application launches on behalf of the user, the application is required to access the record of authorization. In some embodiments, access to a record of authorization is available to a third-party application platforms 202a, 202b, 202c for a specified duration of time. Once this authorization expires, the third-party application cannot obtain the user information.

Figure 4:
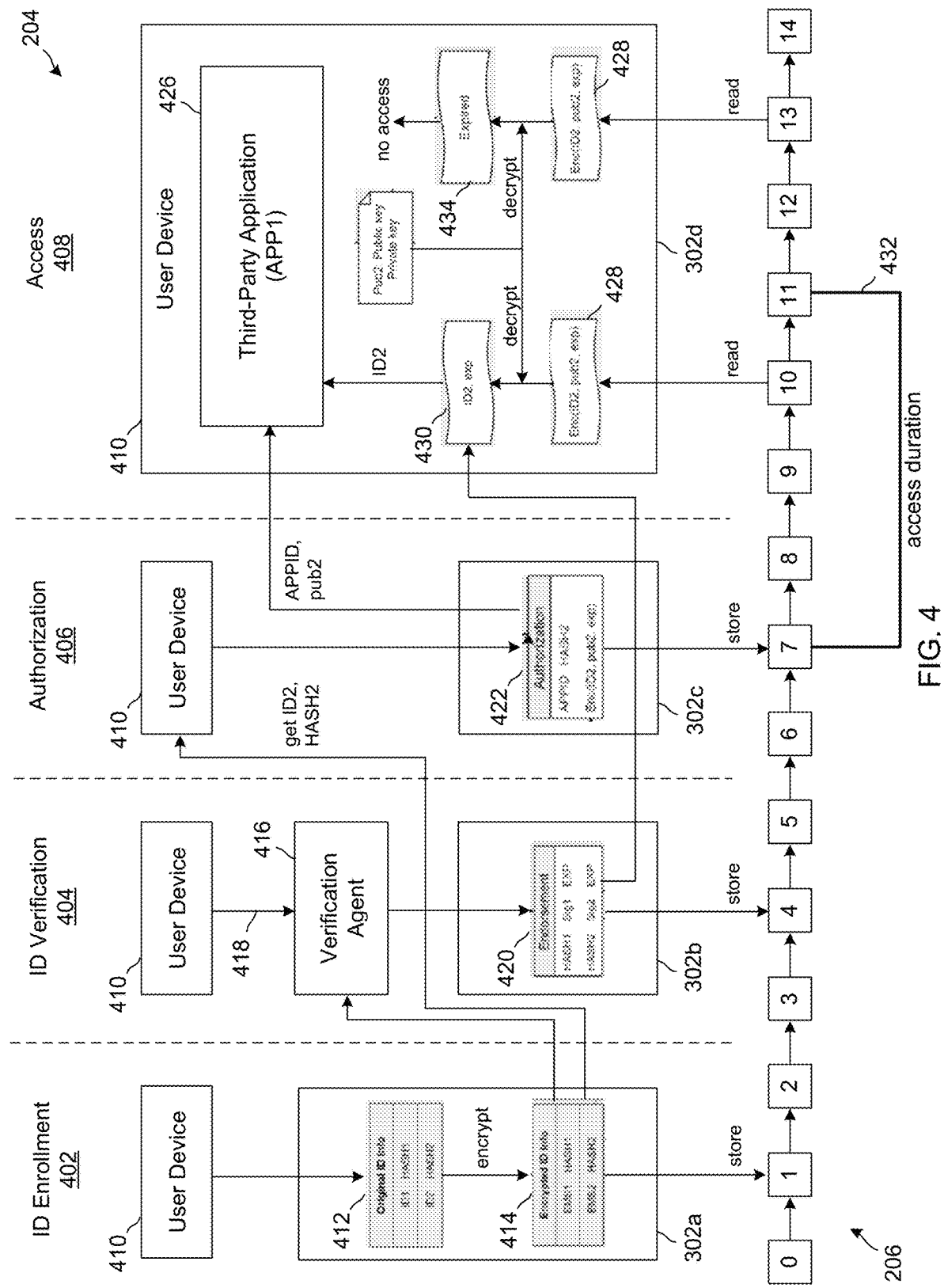
FIG. 4 is a block diagram of various functions of the information control mechanism of FIG. 2 including an enrollment function, a verification function, and an authorization function, together with an access function implemented by a user device operating in conjunction with a third-party application.

Having thus described the high level operation of the mechanism for controlling access to user information, a more detailed description follows:

With reference to FIG. 4, the information control mechanism 204 involves three sub-mechanisms or functions, including a user information (ID) enrollment function 402 that generates a record of user information that includes the user information and appends it to a blockchain 206, a user information verification function 404 that receives a record of endorsement of the record of user information and appends it to the blockchain 206, and an authorization function 406 that receives a record of authorization and appends it to the blockchain 206. These functions 402, 404, 406 may be executed by one or more nodes 302a, 320b, 302c of a decentralized network of nodes that are grouped into an application shard 304 and that function together to run a decentralized application (DAPP) that implements the information control mechanism 204. The function 402, 404, 406 are executed by the nodes 302a, 320b, 302c in conjunction with other devices, including for example, a user device 410 and a validation agent 416.

Continuing with FIG. 4, once a third-party application is granted access to user information through a record of authorization, a user device 410 operating in accordance with the third-party application executes an access function 408 that controls the reading and processing of the record of authorization from the blockchain 206.

User Information Enrollment

During user information enrollment, a node 302a associated with the information control mechanism 204 and executing the enrollment function 402 receives user information from a user, structures the information in a particular format and stores the user information in the form of a blockchain entry. To these ends, and with continued reference to FIG. 4, a user device 410 operating in accordance with a user-side information control application resident on the user device may access a node that is configured to perform certain tasks of the information control mechanism 204 related to the collection of user information. This access may be through the node 302a. User information is entered into the user device 410 through a user interface and submitted to the node 302a. The node 302a creates a record of user information 412 based on the user information. The record of user information 412 at this stage is referred to as an "original record of user information."

In one embodiment, the user information included in the original record of user information 412 may be conceptualized as a single bucket of information that includes a variety of types of user information. In another, more granular embodiment, the user information included in the original record of user information 412 may be categorized into separate, multiple layers of user information, each including one or more sublayers of different types of information. In this configuration, the user information in each successive layer may build upon each of the previous layers to represent increasing detailed user information.

An example layering or categorization of user information upon which an original record of user information 412 may be created is shown in Table 1, wherein each row in the table represents a layer/sublayer of user information:

TABLE 1

| User Information | | |
| --- | --- | --- |
| Layer # (category) | Sublayer # (user information type) | Example |
| 1 (minimal anonymous) | 1 (nickname) | David |
| 2 (basic anonymous) | 1 (email) | cxh@hotmail.com |
| | 2 (user id) | dss1234 |
| 3 (identity real) | 1 (name) | David Smith |
| | 2 (address) | 1 Buckeye Way, Columbus OH, 43210 |
| | 3 (phone number) | 555-432-0001 |
| 4 (personal real) | 1 (date of birth) | 1980 Jan. 1 |
| | 2 (SSN) | 123-45-6789 |
| | 3 (blood type) | A negative |
| | 4 (finger print) | (uploaded image) |
| 5 (confidential real) | 1 (medical report) | (uploaded report) |
| | 2 (credit score) | 850 |

The layering of user information provides additional control over distribution of user information in that access may be granted to third-party applications on a layer-by-layer basis. For example, a third-party application that only requires "minimal anonymous" user information in the form of a nickname will only be granted access to the user information associated with the Layer/Sublayer 1/1 (nickname) layer, while a third application that further requires "basic anonymous" information in the form of an email address and a user id and some "identity real" information in the form of a name, may be granted access to the user information associated with the Layer/Sublayer 1/1 (nickname) layer, the user information associated with the Layer/Sublayers 2/1 (email) and 2/2 (user id) layers, and the user information associated with the Layer/Sublayer 3/1 (name) layer.

As part of the original record of user information 412 creation process, a hash is generated by the node 302a creating the record and is associated with the user information. The hash provides a mechanism for referencing the layers/sublayers of user information included in the original records of user information 412. An example original record of user information 412 created from the user information in Table 1 is shown in Table 2, where the abbreviation "ID" in column one of the table header corresponds to the actual user information:

TABLE 2

| Original Record of User Information | |
| --- | --- |
| Layer/Sublayer # (info type, ID) | Hash # |
| 1/1 (nickname, David) | Hash 1/1 |
| 2/1 (email, cxh@hotmail.com) | Hash 2/1 |
| 2/2 (user id, dss1234) | Hash 2/2 |
| 3/1 (name, David Smith) | Hash 3/1 |
| 3/2 (address, Buckeye Way, Columbus OH, 43210) | Hash 3/2 |

TABLE 2-continued

Original Record of User Information

| Layer/Sublayer # (info type, ID) | Hash # |
|---|---|
| 3/3 (555-432-0001) | Hash 3/3 |
| 4/1 (date of birth, 1980 Jan. 1) | Hash 4/1 |
| 4/2 (SSN, 123-45-6789) | Hash 4/2 |
| 4/3 (blood type, A negative) | Hash 4/3 |
| 4/4 (finger print, uploaded image) | Hash 4/4 |
| 5/1 (medical report, uploaded report) | Hash 5/1 |
| 5/2 (credit score, 850) | Hash 5/2 |

Once the original record of user information is created by the node 302a, an encrypted record of user information 414 is created. To this end, the node 302a encrypts the user information using a public key associated with the user device 410 to create an encrypted record of user information. The encrypted record of user information is associated with the hash generated by the node 302a creating the original record of user information. The hash provide a mechanism for referencing the encrypted records of user information 414. An example encrypted record of user information 414 based on the original record of user information 412 in Table 2 is shown in Table 3, where the abbreviation "EMS" corresponds to encrypted message, meaning an encrypted version of the actual user information, e.g., the ID entries in Table 2:

TABLE 3

Encrypted Record of User Information

| Layer/Sublayer # (info type, EMS) | Hash # |
|---|---|
| 1/1 (nickname, David) | Hash 1/1 |
| 2/1 (email, cxh@hotmail.com) | Hash 2/1 |
| 2/2 (user id, dss1234) | Hash 2/2 |
| 3/1 (name, David Smith) | Hash 3/1 |
| 3/2 (address, Buckeye Way, Columbus OH, 43210) | Hash 3/2 |
| 3/3 (555-432-0001) | Hash 3/3 |
| 4/1 (date of birth, 1980 Jan. 1) | Hash 4/1 |
| 4/2 (SSN, 123-45-6789) | Hash 4/2 |
| 4/3 (blood type, A negative) | Hash 4/3 |
| 4/4 (finger print, uploaded image) | Hash 4/4 |
| 5/1 (medical report, uploaded report) | Hash 5/1 |
| 5/2 (credit score, 850) | Hash 5/2 |

Once the encrypted record of user information 414 is created, the node 302a appends the record to the blockchain 206 to create an instance "1" of the blockchain. Subsequent instances "2", and "3" of the blockchain are created during which other records or blocks of data are appended to the blockchain. The other records may or may not be related to the information control mechanism. For example, other types of blockchain entries may be included in the blockchain 206. In accordance with standard blockchain functionality, the record of user information 414 stored in instance "1" of the blockchain is included in subsequent instances "2", and "3" of the blockchain and all instances thereafter.

User Information Verification

With continued reference to FIG. 4, during user information verification, the user may request a validation agent 416, e.g., a third-party centralized application or a decentralized application/blockchain, to verify the user information included in the encrypted record of user information 414 that is stored in the blockchain 206. To this end, the user may submit through the user device 410 a validation request 418 to a validation agent 416 asking that the user information included in the encrypted record of user information 414 be validated. In one embodiment, the validation request 418 may identify specific user information to be validated by including one or more hashes in the validation request, which hashes are associated with the specific user information. The user then supplies the validation agent 416 with proof of the user information associated with the one or more specified hashes.

The validation agent 416 validates the user information using a validation method. This may be done in a centralized way or a decentralized way. In a centralized way, a centralized agency could verify user information by comparing the information provided by the user against the local database entry of that agency. The type of agency could be a department of motor vehicles, a bank, an organization, an activity group, etc. In a decentralized way, the user's transaction history is recorded in another blockchain. The user can request validation by providing a signed contract. The other blockchain could record the validation into its own ledger, and by cross-chain capability, provide validation in the current blockchain 206.

Upon successful validation of the user information associated with the one or more hashes, the validation agent 416 creates a record of endorsement 420. The record of endorsement 420 generated by the validation agent 416 includes a tuple of information (Hash#, Signature, Expiration) for each user information that has been validated. The hash # identifies the piece of user information that has been validated, the signature indicates that the user information has indeed been validated, and the expiration indicates when the validation expires. The expiration may be in the form of a time stamp, e.g., 12 am on 1/1/2020, or a block number, e.g., 1110 block. An example record of endorsement 420 based on the original record of user information in Table 2 is shown in Table 4, where:

TABLE 4

Record of Endorsement

| Hash # | Signature | Expiration |
|---|---|---|
| Hash 1/1 | Sig1/1 | Jan. 1, 2020, 12pm |
| Hash 2/1 | Sig2/1 | Jan. 1, 2020, 12pm |
| Hash 2/2 | Sig2/2 | Jan. 1, 2020, 12pm |
| Hash 3/1 | Sig3/1 | Jan. 1, 2020, 12pm |
| Hash 3/2 | Sig3/2 | Jan. 1, 2020, 12pm |
| Hash 3/3 | Sig3/3 | Jan. 1, 2020, 12pm |
| Hash 4/1 | Sig4/1 | Jan. 1, 2020, 12pm |
| Hash 4/2 | Sig4/2 | Jan. 1, 2020, 12pm |
| Hash 4/3 | Sig4/3 | Jan. 1, 2020, 12pm |
| Hash 4/4 | Sig4/4 | Jan. 1, 2020, 12pm |
| Hash 5/1 | Sig5/1 | Jan. 1, 2020, 12pm |
| Hash 5/2 | Sig5/2 | Jan. 1, 2020, 12pm |

With reference to FIG. 4, the validation agent 416 submits the record of endorsement 420 to a node 302b associated with the information control mechanism 204 with a request that the record of endorsement be appended to the blockchain 206. The node 302b appends the record of endorsement 420 to the blockchain 206 to create an instance "4" of the blockchain. Subsequent instances "5", and "6" of the blockchain are created during which other records or blocks of data are appended to the blockchain 206. In accordance with standard blockchain functionality, the record of endorsement 420 stored in instance "4" of the blockchain is included in subsequent instances "5" and "6" of the blockchain, and all instances thereafter.

User Information Authorization

With continued reference to FIG. 4, during user information authorization, a node 302c associated with the information control mechanism 204 and executing the authorization function 406 receives a record of authorization 422 from a user device 410 with a request that the record of authorization be appended to the blockchain 206. The node 302c appends the record of authorization 422 to the blockchain 206 to create an instance "7" of the blockchain. Subsequent instances "8" through "14" of the blockchain 206 are created during which other records or blocks of data are appended to the blockchain 206. In accordance with standard blockchain functionality, the record of authorization 422 stored in instance "7" of the blockchain is included in subsequent instances "8" through "14" of the blockchain.

Considering the record of authorization 422 further, this record includes the user information to be made available to a third-party application, together with other information including an identification of the third-party application that is authorized to access the user information, and a time at which the authorization expires. The record of authorization 422 is created by a user through the user device 410. The user device 410 operating in accordance with a user-side information control application resident on the user device may access a node that is configured to perform certain tasks of the information control mechanism 204 related to the authorization function 406. This node may be, for example, the node 302c.

A user seeking to release user information to a third-party application accesses the authorization function 406 of the information control mechanism 204 through node 302c and submits a request to read the encrypted record of user information 414 that includes the user information to be made available. The user device 410 operating in accordance with the user-side information control application, reads the encrypted record of user information 414 and decrypts the user information into its original form, e.g., plain text, using the private key that is paired to the public that was used to encrypt the original user information.

The user device 410 operating in accordance with the user-side information control application, generates a record of authorization 422. The record of authorization 422 includes an identification portion and a message portion. The identification portion includes the hash # corresponding to the user information to be made available, the identification of the third-party application that is be authorized to access the user information, and an expiration parameter that define a duration of time for which the authorization is valid. The message portion includes the user information and the third-party application public key. The user device 410 operating in accordance with a user-side information control application encrypts the message portion using the public key provided to the user device by the third party application. The record of authorization 422 may be represented by the string:

[Hash#, AppID, Exp, Enc(ID, App Pubkey)], where
  Hash#=the hash number corresponding to the user information
  AppID=the identification of the third-party application that is being granted access to the user information
  Exp=a date or time at which the access authorization expires
  Enc=encrypted
  ID=the user information for which access is being granted
  App Pubkey=the public key of the third-party application.

The user device 410 operating in accordance with a user-side information control application, communicates the record of authorization 422 to a node that is configured to perform certain tasks of the information control mechanism 204 related to the authorization function 406. This node may be, for example, the node 302c. The node 302c appends the record of authorization 422 to the blockchain 206.

User Information Access

Once a third-party application 426 is granted access to user information through a record of authorization 422, a user device 410 operating in accordance with the third-party application executes the access function 408 of the information control mechanism 204. The access function 408 controls the reading and processing of the record of authorization from the blockchain 206.

To this end, a user device 410 operating in accordance with a third-party application 426 granted authorization to read a record of authorization 422 stored in the blockchain 206, may read the record of authorization at various instances or times. For example, in FIG. 4, a first read of user information from the record of authorization 422 occurs at instance "10" of the blockchain 206, while a second read occurs at instance "13" of the blockchain.

The user device 410 locates the record of authorization 422 within the blockchain 206 based on one or more location references provided to the third-party application 426 by the owner of the user information. A location reference may specify a record or data block entry number corresponding to the location of the record of authorization 422 within the blockchain 206. Additional location references may specify a record or data block entry number of the encrypted record of user information 414, or a record or data block entry number of the record of endorsement 420.

Upon reading a record of authorization 422, the user device 410 operating in accordance with the third-party application 426 decrypts the encrypted message portion 428 of the record of authorization using the application's private key of the third-party application 426 that is paired to the application public key of the application that was used to encrypt the messages contents, to thereby obtain the user information and the expiration information 430.

The third-party application 426 then checks the expiration information to determine if access to the user information is authorized or if the duration of access has expired. The duration of access may be specified as a time period or a number of blocks. For example, in FIG. 4, the duration of access 432 is shown graphically to correspond to the time between five blocks, e.g., instance "7" and to instance "11," of the blockchain 206.

In the reading of the record of authorization 422 at instance "10" of the blockchain 206, the third-party application 426 determines that access is authorized. Accordingly, the third-party application 426 stores the user information in a non-persistent data storage (memory, cache, etc.) resident in the user device operating the third-party application and executes operations for the user. The third-party application 426 retains the user information in the data storage and uses the user information as needed for as long as the third-party application is operating on behalf of the user. The third-party application 426, however, is not permitted to store the user information in a persistent storage, e.g., server database.

By the time of instance "13" of the blockchain 206, the duration of access 432 has already expired. Accordingly, when reading of the record of authorization 422 at instance "13" the third-party application 426 determines that the authorization to access user information has expired 434.

Thus, the third-party application 426 operating in accordance with an application-side user information control application refrains from storing the user information in the user device 410.

When the current application session ends, e.g., the user closes the application or logs out, the third-party application 426 operating in accordance with an application-side user information control application, purges the user information from the non-persistent data storage of the user device 410 operating the third-party application 426. Accordingly, the next time the third-party application 426 launches a session on behalf of the user and requires the user information, the third-party application will read the record of authorization 422, and either store the user information or refrain from storing the user information depending on the expiration parameter included in the record.

Figure 5:
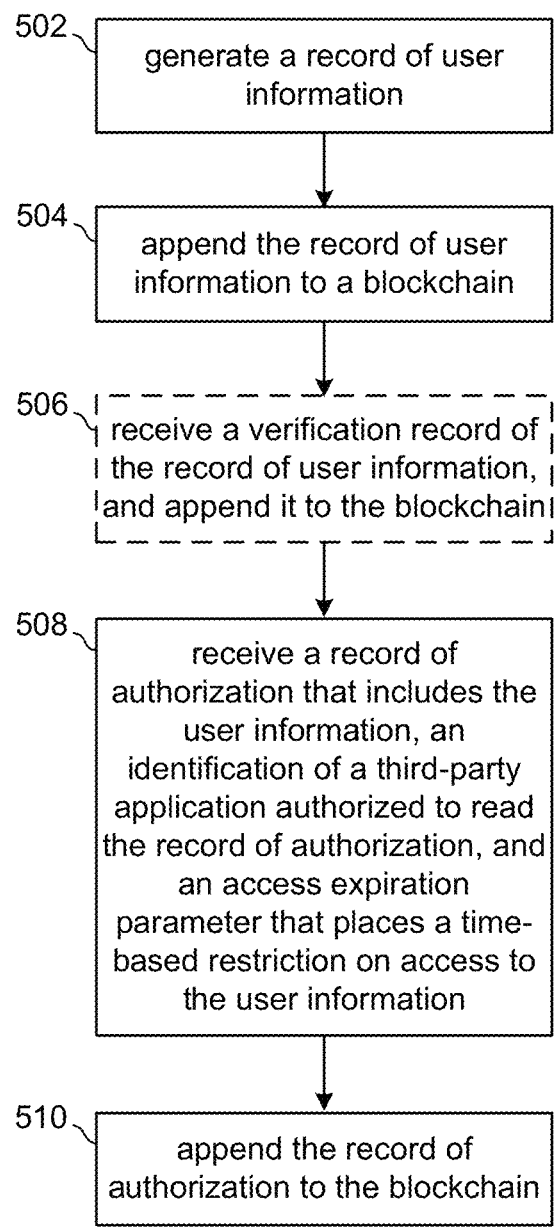
FIG. 5 is a flowchart of a method of controlling access to user information.

FIG. 5 is a flowchart of an example method of controlling access to user information. The method may be performed, for example, by one or more nodes 302 of a decentralized network of nodes that are grouped into an application shard 304 and that function together to run a decentralized application (DAPP) that implements the various functions of an information control mechanism 204 like the one in FIG. 4.

At block 502, an enrollment function 402 of the information control mechanism 204 generates a record of user information 412 that includes the user information. To this end, the enrollment function 402 receives one or more inputs from a user device 410 corresponding to the user information, and assigns a hash to the user information. For example, a user may enter his information into a user device 410, e.g., smartphone, laptop, etc., operating in accordance with an application that interfaces with the functionality of the enrollment function 402, wherein the user device is configured to submit the information to the enrollment module over a communications network interface.

At block 504, the enrollment function 402 may append the record of user information 412 to a blockchain 206. In one configuration, prior to appending the record of user information to the blockchain 206, the enrollment function 402 encrypts the record of user information using a public key corresponding to a private key of the user device to create am encrypted record of user information 414, and then appends it to the blockchain in place of the original record of user information 412.

Optionally, at block 506, a verification function 404 of the information control mechanism 204 receives a record of endorsement 420 of the record of user information 414, and appends it to the blockchain 206. The record of endorsement 420 is obtained from a verification agent that may be a third-party application or may be an additional mechanism included in the information control mechanism 204 itself. The record of endorsement 420 confirms the veracity of the user information and includes a signature of verification, a verification expiration parameter that denotes when the verification expires, and the hash assigned to the user information.

At block 508, an authorization function 406 of the information control mechanism 204 receives a record of authorization 422. The record of authorization 422 may be received from a user device 424 operating in accordance with an application that interfaces with the functionality of the authorization function 406. The user device 424 is configured to submit the information to the authorization module over a communications network interface.

The record of authorization 422 includes the same user information included in the record of user information 414 appended to the blockchain. The record of authorization 422 further includes an identification of a third-party application authorized to read the record of authorization, and an access expiration parameter that places a time-based restriction on access to the user information. More specifically, in one configuration, the record of authorization 422 includes an identification portion that includes the identification of the third-party application and the hash corresponding to the user information, and a message portion that includes the user information, a public key of the third-party application, and the access expiration parameter. In some embodiment, the message portion of the record of authorization 422 is encrypted.

At block 510, the authorization function 406 appends the record of authorization 422 to the blockchain 206.

Figure 6:
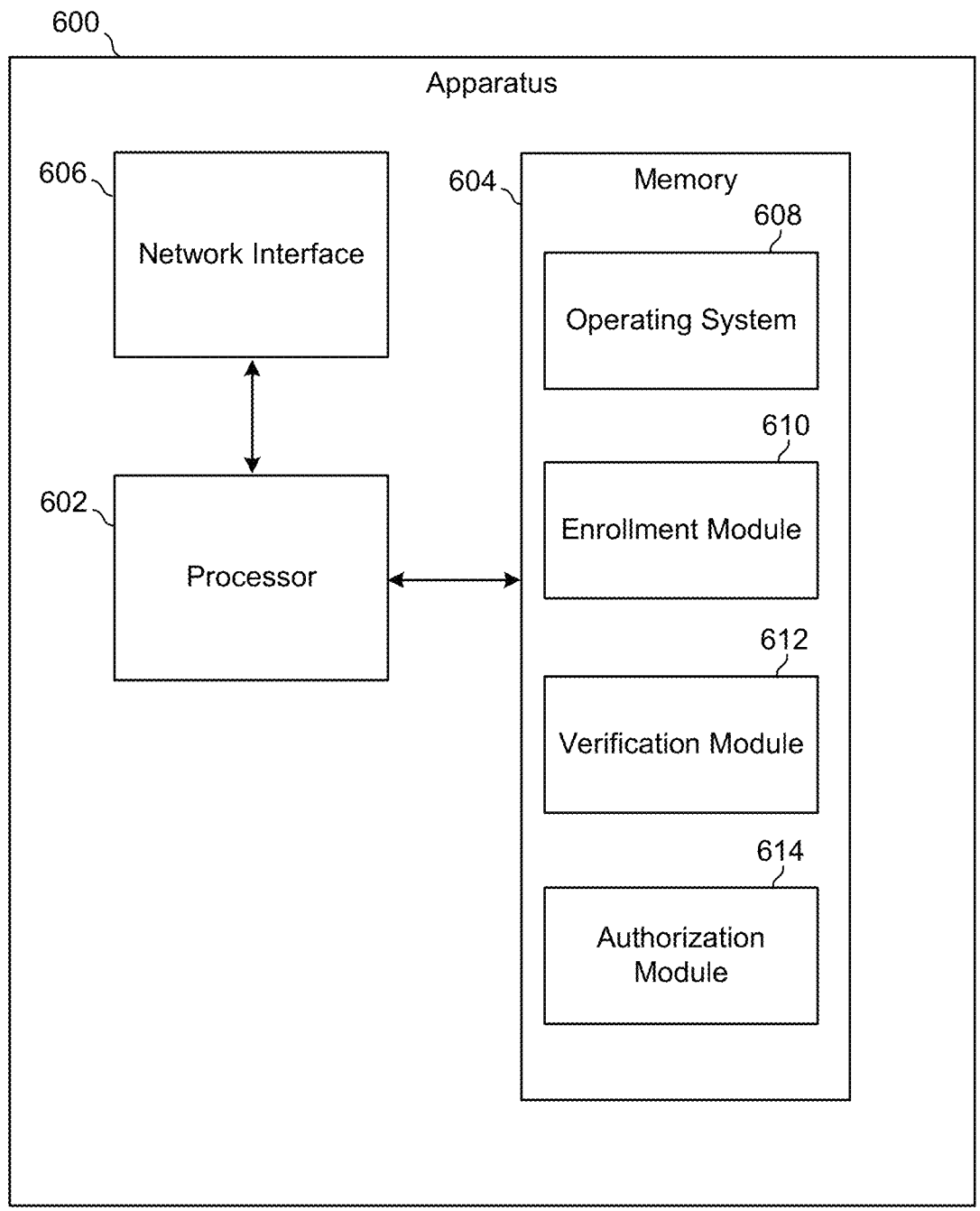
FIG. 6 is a block diagram of an apparatus configured to implement the method of FIG. 5.

FIG. 6 is a schematic block diagram of an apparatus 600. The apparatus 600 may correspond to one of the one or more nodes 302 of a decentralized network of nodes that are grouped into an application shard 304 and that function together to run a decentralized application (DAPP) that implements the enrollment function 402, the verification function 404, and the authorization function 406 of an information control mechanism 204, as described above with reference to FIGS. 2, 3 and 4.

The apparatus 600 may include one or more processors 602 configured to access and execute computer-executable instructions stored in at least one memory 604. The processor 602 may be implemented as appropriate in hardware, software, firmware, or combinations thereof. Software or firmware implementations of the processor 602 may include computer-executable or machine-executable instructions written in any suitable programming language to perform the various functions described herein. The processor 602 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 600 may also include a chipset (not shown) for controlling communications between the processor 602 and one or more of the other components of the apparatus 600. The processor 602 may also include one or more application-specific integrated circuits (ASICs) or application-specific standard products (ASSPs) for handling specific data processing functions or tasks.

The memory 604 may include, but is not limited to, random access memory (RAM), flash RAM, magnetic media storage, optical media storage, and so forth. The memory 604 may include volatile memory configured to store information when supplied with power and/or non-volatile memory configured to store information even when not supplied with power. The memory 604 may store various program modules, application programs, and so forth that may include computer-executable instructions that upon execution by the processor 602 may cause various operations to be performed. The memory 604 may further store a variety of data manipulated and/or generated during execution of computer-executable instructions by the processor 602.

The apparatus 600 may further include one or more network interfaces 606 that may facilitate communication between the apparatus 600 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 604 may store various program modules, application programs, and so forth that may include computer-executable instructions that upon execution by the processor 602 may cause various operations to be performed. For example, the memory 604 may include an operating system module (O/S) 608 that may be configured to manage hardware resources such as the network interface 606 and provide various services to applications executing on the apparatus 600.

The memory 604 stores additional program modules such as a an enrollment module 610, a verification module 612, and an authorization module 614, each of which includes functions in the form of logic and rules that respectively support and enable the enrollment, verification, authorization, and access functions described above with reference to FIGS. 3, 4 and 5. Although illustrated as separate modules in FIG. 6, one or more of the modules may be a part of or a submodule of another module.

The apparatus 600 and modules 610, 612, 614 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of controlling access to user information, the method comprising:
generating a record of user information that includes the user information; appending the record of user information to a blockchain;
receiving a record of authorization that includes the user information, an identification of a third-party application authorized to read the record of authorization, and an access expiration parameter that places a restriction on access to the user information; and
appending the record of authorization to the blockchain, wherein the record of authorization comprises:
an identification portion that includes the identification of the third-party application and a hash corresponding to the user information; and
a message portion that includes the user information, a public key of the third-party application, and the access expiration parameter.

2. The method of claim 1, wherein generating a record of user information comprises:
receiving one or more inputs corresponding to the user information; and
assigning a hash to the user information.

3. The method of claim 1, further comprising encrypting the record of user information prior to appending the record of user information to the blockchain.

4. The method of claim 1, further comprising:
receiving a record of endorsement of the record of user information; and
appending the record of endorsement to the blockchain.

5. The method of claim 4, wherein the record of endorsement confirms the veracity of the user information and includes information comprising a signature of verification, a verification expiration parameter that denotes when the verification expires, and a hash assigned to the user information.

6. The method of claim 1, wherein the message portion of the record of authorization is encrypted.

7. The method of claim 1, wherein the user information included in the record of authorization corresponds to the user information included in the record of user information appended to the blockchain.

8. The method of claim 1, further comprising:
reading the record of authorization; and determining to store the user information based on the access expiration parameter.

9. An apparatus for controlling access to user information, the apparatus comprising:
a network interface;
a memory; and
a processor coupled to the network interface and the memory and configured to:
generate a record of user information that includes the user information;
append the record of user information to a blockchain;
receive a record of authorization that includes the user information, an identification of a third-party application authorized to read the record of authorization, and an access expiration parameter that places a restriction on access to the user information; and append the record of authorization to the blockchain, wherein the record of authorization comprises:
   an identification portion that includes the identification of the third-party application and a hash corresponding to the user information; and
   a message portion that includes the user information, a public key of the third-party application, and the access expiration parameter.

10. The apparatus of claim 9, wherein the processor generates a record of user information by being further configured to: receive one or more inputs corresponding to the user information; and assign a hash to the user information.

11. The apparatus of claim 9, wherein the processor is further configured to encrypt the record of user information prior to appending the record of user information to the blockchain.

12. The apparatus of claim 9, wherein the processor is further configured to:
   receiving a record of endorsement of the record of user information; and
   appending the record of endorsement to the blockchain.

13. The apparatus of claim 12, wherein the record of endorsement confirms the veracity of the user information and includes information comprising a signature of verification, a verification expiration parameter that denotes when the verification expires, and a hash assigned to the user information.

14. The apparatus of claim 9, wherein the message portion of the record of authorization is encrypted.

15. The apparatus of claim 9, wherein the user information included in the record of authorization corresponds to the user information included in the record of user information appended to the blockchain.

16. A mechanism for controlling access to user information, the mechanism comprising:
   a non-volatile memory for storing one or more instructions; and a processor when executing the one or more instructions stored in the memory performs the steps of
   generating a record of user information that includes the user information, and append the record of user information to a blockchain; and
   receiving a record of authorization, and append the record of authorization to the blockchain, wherein the record of authorization comprises:
   an identification portion that includes the identification of the third-party application and a hash corresponding to the user information; and
   a message portion that includes the user information, a public key of the third-party application, and the access expiration parameter.

17. The mechanism of claim 16, wherein the processor is further configured to encrypt the record of user information prior to appending the record of user information to the blockchain.

18. The mechanism of claim 16, wherein the processor is further configured to receive a record of endorsement of the record of user information, and append the record of endorsement to the blockchain.

* * * * *